(12) United States Patent
McShirley

(10) Patent No.: US 7,185,805 B1
(45) Date of Patent: Mar. 6, 2007

(54) WIRELESS CHECK AUTHORIZATION

(75) Inventor: Robert C. McShirley, Oxnard, CA (US)

(73) Assignee: transmodus, Inc., Oxnard, CA (US)

( * ) Notice: Subject to any disclaimer, the term of this patent is extended or adjusted under 35 U.S.C. 154(b) by 252 days.

(21) Appl. No.: 10/916,345

(22) Filed: Aug. 10, 2004

(51) Int. Cl.
G06Q 40/00 (2006.01)
G07D 11/00 (2006.01)
G07F 19/00 (2006.01)

(52) U.S. Cl. ......................................... 235/379; 705/45
(58) Field of Classification Search ................ 235/379; 705/17, 45
See application file for complete search history.

(56) References Cited

U.S. PATENT DOCUMENTS

| | | | |
|---|---|---|---|
| 4,109,238 A | 8/1978 | Creekmore | |
| 5,504,677 A | 4/1996 | Pollin | |
| 5,742,905 A | 4/1998 | Pepe et al. | |
| 5,787,403 A | 7/1998 | Randle | |
| 5,801,366 A | 9/1998 | Funk et al. | |
| 5,832,463 A | 11/1998 | Funk | |
| 5,991,749 A | 11/1999 | Morrill, Jr. | |
| 6,036,344 A | 3/2000 | Goldenberg | |
| 6,059,185 A | 5/2000 | Funk et al. | |
| 6,305,603 B1 | 10/2001 | Grunbok, Jr. et al. | |
| 6,430,407 B1 | 8/2002 | Turtiainen | |
| 6,464,134 B1 | 10/2002 | Page | |
| 6,529,725 B1 | 3/2003 | Joao et al. | |
| 6,529,885 B1 | 3/2003 | Johnson | |
| 6,598,028 B1 | 7/2003 | Sullivan et al. | |
| 6,606,606 B2 | 8/2003 | Starr | |
| 6,609,113 B1 | 8/2003 | O'Leary et al. | |
| 6,609,200 B2 | 8/2003 | Anderson et al. | |
| 6,647,376 B1 | 11/2003 | Farrar et al. | |
| 6,662,193 B1 | 12/2003 | Christensen | |
| 6,676,017 B1 | 1/2004 | Smith, III | |
| 6,714,918 B2 | 3/2004 | Hillmer et al. | |
| 6,754,640 B2 | 6/2004 | Bozeman | |
| 2001/0037315 A1* | 11/2001 | Saliba et al. | 705/70 |
| 2005/0125347 A1* | 6/2005 | Akialis et al. | 705/40 |
| 2006/0026099 A1* | 2/2006 | Danz et al. | 705/44 |

FOREIGN PATENT DOCUMENTS

WO WO9736267 10/1997

OTHER PUBLICATIONS http://www.greensheet.com/PriorIssues-/010702-8/.htm.
http://www.cross-check.com/CrossCheckHTMLSite/checkguarantee.asp.
http://www.cross-check.com/CrossCheckHTMLSite/sayyes.asp.
http://www.eweek.com/article2/0,1895,1939875,00.asp.
http://www.commerciant.com/prodsvcs/checkprocessing/index.htm.

* cited by examiner

Primary Examiner—Lisa M. Caputo
(74) Attorney, Agent, or Firm—SoCal IP Law Group LLP

(57) ABSTRACT

A wireless check authorization system and method that determines in real time, upon receipt of check information from a check writer, whether the check writer's checking account is open, whether the check writer has written more than a specified number of checks in a specified time period, whether the check writer's checking account has any unpaid checks, and/or whether the checking account has a positive account balance, using a standard off-the-shelf handheld wireless device, such as a text messaging enabled cell phone, web enabled cell phone, short message service enabled wireless device, wireless application protocol enabled cell phone, personal digital assistant, pager, mobile phone, or other suitable wireless device, that a check taker typically carries substantially at all times, is easy to use, low priced, cost effective, and indicates to the check taker, in a simple and easy to understand manner, whether or not to accept a check for payment.

36 Claims, 6 Drawing Sheets

WIRELESS CHECK AUTHORIZATION

BACKGROUND OF THE INVENTION

1. Field of the Invention

The present invention relates generally to check authorization and more particularly to check authorization using portable wireless devices.

2. Background Art

It is estimated that more than three hundred and sixty five million checks are returned to individuals and/or businesses annually, without payment being made. Many of these checks are fraudulent or have other problems, which limit the payee from being paid by the payer. These checks are typically not processed at the point of transaction to determine if the checks should be authorized or denied, and if the checks could be processed at the point of transaction, acceptance of fraudulent checks and checks having other problems could be reduced.

Payees, individuals accepting checks on behalf of the payees, delivery persons, merchants, and the like, hereinafter called "check takers", have the need to accept checks for payment of merchandise at the point of transaction, which is often at the time and place of delivery; however, because of the inability of the check taker to verify whether the customer or payer, hereinafter called "check writer", checking account is open, whether the check writer has written more than a specified number of checks in a specified time period, has any unpaid checks, or whether the check writer's checking account has a positive account balance, the payee is often subject to not getting paid for merchandise being delivered. This, then, raises concern and often reluctance of the check taker to accept checks at the time of delivery, which decreases the payee's ability to transact business, especially when the check writer prefers or has to pay by check.

Of course, if the check taker could obtain access to banking information in real time, which indicates or instructs the check taker to accept a check, while making the delivery, much of the doubt and concern about payment could be eliminated.

If a check taker could also obtain such instructions from a device that he or she normally carries, then many of the check problems would be solved. The check taker could then determine, while making the delivery, before handing the merchandise over to the check writer, whether the check writer's checking account is open, whether the check writer has written more than a specified number of checks in a specified time period, whether the check writer has any unpaid checks, and whether the check writer's checking account has a positive account balance, and, in fact, whether the check taker will actually get paid upon delivery of the merchandise.

It is, thus, necessary to determine, in real time, upon receipt of check information from a check writer, whether the check writer's checking account is open, whether the check writer has written more than a specified number of checks in a specified time period, whether the check writer's checking account has any unpaid checks, and/or whether the checking account has a positive account balance, using a device and preferably a standard off-the-shelf handheld wireless device, such as a text messaging enabled cell phone, web enabled cell phone, short message service (SMS) enabled wireless device, wireless application protocol (WAP) enabled cell phone, personal digital assistant (PDA), pager, mobile phone, or other suitable wireless device, that the check taker typically carries substantially at all times, is easy to use, low priced, cost effective, and indicates to the check taker, in a simple and easy to understand manner, whether or not to accept a check for payment.

Different check authorization systems and methods have heretofore been known. However, none of the check authorization systems and methods adequately satisfies these aforementioned needs.

U.S. Pat. No. 6,754,640 (Bozeman) discloses a universal positive pay match, authentication, authorization, settlement and clearing system The system includes several technologies for inputting check register information connectively from various users of the system, a database for storing the check register information and the check histories, software that searches for and captures escheated check register information, software that automatically polls check register information from the customer, the customer's bank or merchant and conducting and transmitting a partial or full reconciliation of the check register information from the system to the customer to reduce check and card fraud. Also included in the system is the ability of the customer's bank to provide either a stalled debit or debit stall to the customer.

World Patent No. WO9736267 (Funk) discloses an automated positive check authorization system, which includes an input device for receiving a check amount and checking account information pre-printed on a check drawing on a checking account presented in a transaction at the time of check presentment. The checking account information and check amount are electronically transmitted to a check verifier, which receives the check amount and checking account information from the input device and searches a checking account database for a current balance in the checking account. An approval or decline message is issued in response to a comparison between the check amount and the current balance in the checking account. A decline message is also issued if there is a stop payment instruction on the check.

Internet site uniform resource locator (URL) http://www.commerciant.com/ discloses a wireless check processing system which provides for real-time authorization and clearing of checks at the point of sale. Bank routing and customer account numbers are captured along with the customer's signature.

Internet site uniform resource locator (URL) http://www.pizzanewsonline.com/cross_check_authorization.htm discloses a check authorization application that runs on a wireless handheld device that enables a merchant to enter check information into the handheld wireless device and have a check approved within 2–3 seconds.

For the foregoing reasons, there is a need for a system and method to determine, in real time, upon receipt of check information from a check writer, whether the check writer's checking account is open, whether the check writer has written more than a specified number of checks in a specified time period, whether the check writer's checking account has any unpaid checks, and/or whether the checking account has a positive account balance, using a device and preferably a standard off-the-shelf handheld wireless device, such as a text messaging enabled cell phone, web enabled cell phone, short message service (SMS) enabled wireless device, wireless application protocol (WAP) enabled cell phone, personal digital assistant (PDA), pager, mobile phone, or other suitable wireless device, that the check taker typically carries substantially at all times, is easy to use, low priced, cost effective, and indicates to the check taker, in a simple and easy to understand manner, whether or not to accept a check for payment.

SUMMARY

The present invention is directed to a system and method that determines in real time, upon receipt of check information from a check writer, whether the check writer's checking account is open, whether the check writer has written more than a specified number of checks in a specified time period, whether the check writer's checking account has any unpaid checks, and/or whether the checking account has a positive account balance, using a standard off-the-shelf handheld wireless device, such as a text messaging enabled cell phone, web enabled cell phone, short message service (SMS) enabled wireless device, wireless application protocol (WAP) enabled cell phone, personal digital assistant (PDA), pager, mobile phone, or other suitable wireless device, that a check taker typically carries substantially at all times, is easy to use, low priced, cost effective, and indicates to the check taker, in a simple and easy to understand manner, whether or not to accept a check for payment.

A check authorization method, in which a server responsive to a handheld wireless device client operated by a check taker requests checking account authorization for a check written by a check writer having a checking account, the server interacting with a database having checking account status information and check taker account information, having features of the present invention comprises the steps of: a) the server determining from the database check taker account information if the check taker is registered to use the check authorization method and if the check taker has a check taker account that is up to date, a1) if the check taker is not registered to use the check authorization method, informing the check taker to register to use the check authorization method and establish the check taker account, a2) if the check taker is registered to use the check authorization method, the server determining from the database check taker account information if the check taker has the check taker account that is up to date, a3) if the check taker is registered to use the check authorization method and if the check taker account is not up to date, informing the check taker to update the check taker account; b) if the check taker is registered to use the check authorization method and the check taker has an account that is up to date, the server determining from the database checking account information if the check writer checking account is open, b1) if the check writer checking account is not open, informing the check taker that the check is not authorized; c) if the check taker is registered to use the check authorization method and the check taker has an account that is up to date and the check writer checking account is open, the server determining from the database checking account information if the check writer has written more than a specified number of checks in a specified time period, c1) if the check writer has written more than the specified number of checks in the specified time period, informing the check taker that the check is not authorized; d) if the check taker is registered to use the check authorization method and the check taker has an account that is up to date and the check writer checking account is open, and the check writer has not written more than the specified number of checks in the specified time period, the server determining from the database checking account information if the check writer issued at least one the check that has been unpaid, d1) if the check writer issued the at least one check that has been unpaid, informing the check taker that the check is not authorized; e) if the check taker is registered to use the check authorization method and the check taker has an account that is up to date and the check writer checking account is open, and the check writer has not written more than the specified number of checks in the specified time period, and the check writer did not issue the at least one check that has been unpaid, the server determining from the database checking account information if the check writer checking account has a positive account balance, e1) if the check writer checking account does not have a positive checking account balance, informing the check taker that the check is not authorized; e2) if the check writer checking account does have a positive checking account balance, informing the check taker that the check is authorized.

Another check authorization method, in which a server responsive to a handheld wireless device client operated by a check taker requests checking account authorization for a check written by a check writer having a checking account, the server interacting with a database having checking account status information and check taker account information, having features of the present invention comprises the steps of: a) the server determining from the database check taker account information if the check taker is registered to use the check authorization method and if the check taker has a check taker account that is up to date, a1) if the check taker is not registered to use the check authorization method, informing the check taker to register to use the check authorization method and establish the check taker account, a2) if the check taker is registered to use the check authorization method, the server determining from the database check taker account information if the check taker has the check taker account that is up to date, a3) if the check taker is registered to use the check authorization method and if the check taker account is not up to date, informing the check taker to update the check taker account; b) if the check taker is registered to use the check authorization method and the check taker has an account that is up to date, the server determining from the database checking account information if the check writer issued at least one the check that has been unpaid, b1) if the check writer issued the at least one check that has been unpaid, informing the check taker that the check is not authorized, b2) if the check writer did not issue the at least one check that has been unpaid, informing the check taker that the check is authorized.

A wireless check authorization system, having features of the present invention comprises: an off-the-shelf text message enabled handheld wireless device client; a wireless device provider; a network; a checking account status system, comprising a server and a database; the handheld wireless device client communicating with the server one with the other via the wireless service provider and the network interconnected one with the other; the handheld wireless device client requesting check authorization instructions from the server; the server requesting checking account information from the database; the server analyzing the checking account information and generating check authorization instructions; the server providing the check authorization instructions to the wireless device client as a text message.

Another wireless check authorization system, having features of the present invention comprises: an off-the-shelf web enabled handheld wireless device client; a wireless device provider; a network; a checking account status system, comprising a server and a database; the handheld wireless device client communicating with the server one with the other via the wireless service provider and the network interconnected one with the other; the handheld wireless device client requesting check authorization instructions from the server; the server requesting checking account information from the database; the server analyzing the checking account information and generating check authorization instructions; the server providing the check authorization instructions to the wireless device client as a web message.

DRAWINGS

These and other features, aspects, and advantages of the present invention will become better understood with regard to the following description, appended claims, and accompanying drawings where:

DESCRIPTION

The preferred embodiments of the present invention will be described with reference to FIGS. 1–6 of the drawings. Identical elements in the various figures are identified with the same reference numbers.

Figure 1:
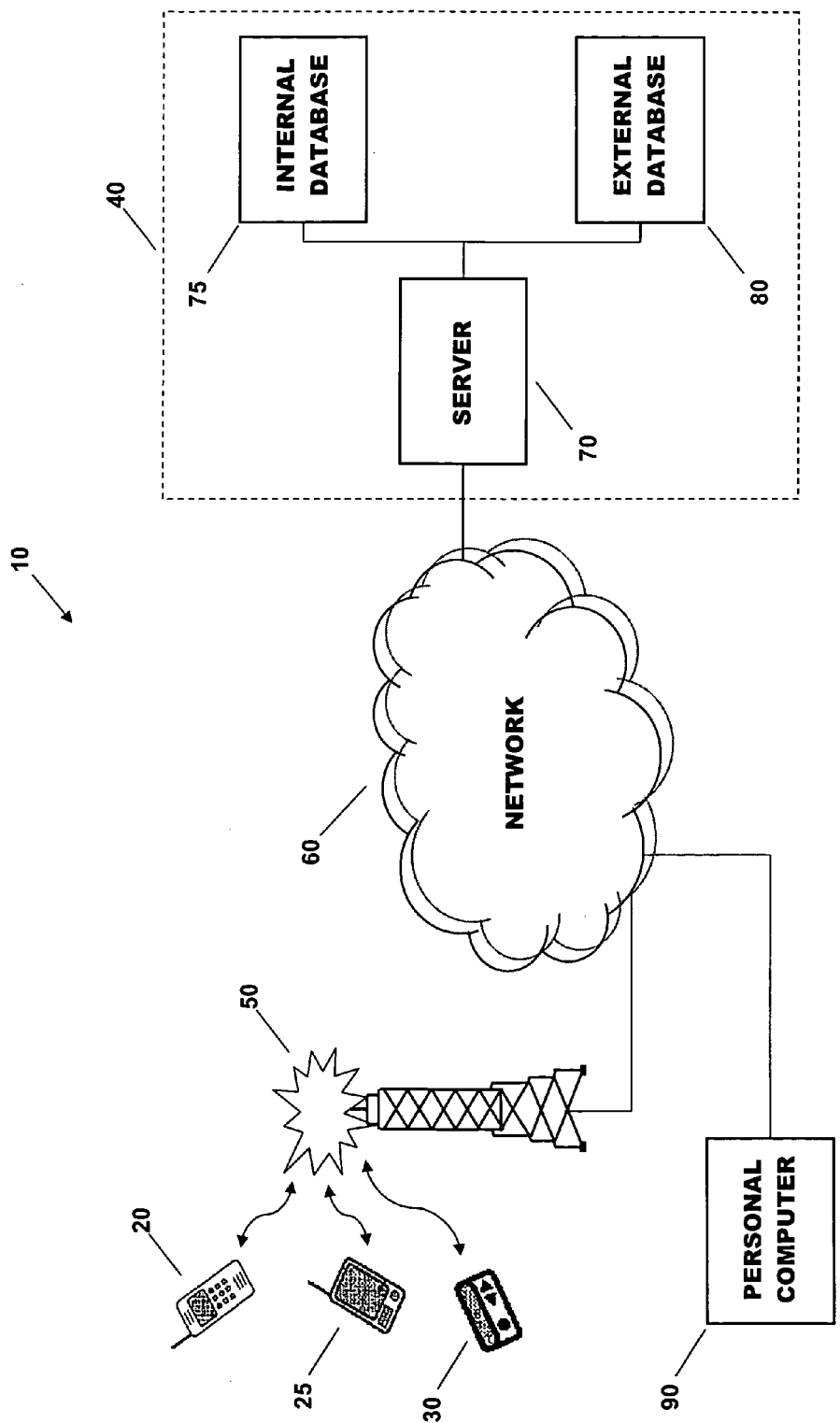
FIG. 1 is a schematic representation of a wireless check authorization system, constructed in accordance with the present invention.

FIG. 1 shows a wireless check authorization system 10, constructed in accordance with the present invention, in which a handheld wireless device client 20, 25, or 30, which includes a text messaging and/or web enabled cell phone 20, personal digital assistant (PDA) 25, pager 30, mobile phone, or other suitable off-the shelf handheld wireless device, hereinafter called "handheld wireless device client 20, 25, or 30", requests customer checking account status from a checking account status system 40. The handheld wireless device client 20, 25, or 30 communicates with the checking account status system 40 via wireless service provider 50 and network 60.

The checking account status system 40 has server 70, which manages the checking account status system 40 and communicates with the handheld wireless device client 20, 25, or 30, internal, database 75, which maintains status information for selected checking accounts, and optional external database 80, which maintains status information for additional checking accounts and/or supplementary checking account information.

The handheld wireless device client 20, 25, or 30 communicates with the server 70 and transfers information to and from the server 70 one with the other via the wireless service provider 50 and the network 60. Personal computer 90 may be used to communicate with the checking account status system 40 via the network 60, and may be used to register, update, provide account information, and manage selected tasks for the handheld wireless device client 20, 25, or 30.

Typical handheld wireless device clients 20, 25, or 30 of the wireless check authorization system 10 include off-the-shelf handheld wireless devices that are capable of communicating, receiving, and transmitting information services, and have text based user interfaces and/or graphical user interfaces. The handheld wireless device clients 20, 25, or 30 may typically be purchased as off-the-shelf items at department stores, discount outlets, the internet, and other suitable vendors, which are intended for use and purchase by the general public for standard handheld wireless telecommunications.

The handheld wireless device clients 20, 25, or 30 of the present invention may use short message service (SMS) for text messaging and wireless application protocol (WAP) for web enabled handheld wireless device clients, although other suitable message service standards and/or protocols may be used. The wireless check authorization system 10 is not limited to the handheld wireless device clients 20, 25, or 30, which use short message service (SMS) for text messaging and wireless application protocol (WAP) for web enabled cell phones 20, the personal digital assistant (PDA) 25, the pager 30, and the like.

Current short message service (SMS) standards for transmission of short text messages use messages that are less than or equal to 160 alphanumeric characters and contain no images or graphics. The short message service (SMS) is currently a globally accepted wireless service that enables the transmission of alphanumeric messages between cellular and/or mobile subscribers, and external systems such as electronic mail, paging, and voice-mail systems. The wireless check authorization system 10 of the present invention is not limited, however, to the short message service (SMS), and may be used with other suitable wireless text message services, standards, and/or protocols, which may include text messages having other lengths, images, and/or graphics.

Current wireless application protocol (WAP) standards use wireless markup language (WML) for display of information on WAP enabled browsers, although other markup languages may be used as the wireless application protocol (WAP) standards change, and as other protocols for use with wireless devices emerge. WAP standards are based on Internet standards (HTML, XML and TCP/IP), and includes a WML language specification, a WMLScript specification, and a Wireless Telephony Application Interface (WTAI) specification. The wireless check authorization system 10 of the present invention is not limited, however, to the wireless application protocol (WAP) or the wireless markup language (WML) and may be used with other suitable wireless protocols and/or markup languages.

The server 70 communicates with the handheld wireless device clients 20, 25, or 30 and the personal computer 90, and the handheld wireless device clients 20, 25, or 30 and the personal computer 90 communicate with the server 70, which generates the appropriate message, using SMS, TCP/IP, WAP, HTML, XML, and other suitable text messaging and/or web enabling standards, protocols, and/or markup languages for interactivity between the server 70 and the handheld wireless device clients 20, 25 one with the other, or 30 and between the server 70 and the personal computer 90 one with the other.

The handheld wireless device clients 20, 25, or 30 and/or the personal computer 90 are standard and off the shelf, and do not require any specialized set up or programming other than that required for normal set up and/or operation. The server 70 communicates with the handheld wireless device clients 20, 25, or 30 and/or the personal computer 90 in suitable languages compatible with each. WML or another suitable language may be used by the server 70 to communicate with the handheld wireless device client 20, 25, or 30 one with the other, and HTML, XML or another suitable language may be used by the server 70 to communicate with the personal computer 90 one with the other. Other suitable languages may also be used. No modifications to the handheld wireless device clients 20, 25, or 30 are required.

The wireless service provider 50 may use a variety of transmission means, such as, for example, frequency division multiple access (FDMA), time division multiple access (TDMA), or code division multiple access (CDMA), or wireless technology based upon the Global System for Mobile Communications (GSM), or other suitable wireless technologies. The wireless service provider 50 may also provide services to and from a Public Switched Telephone Network (PSTN).

The network 60 may be a public or private interconnected network, a generic network, or combination thereof, typical examples of which include a global network, such as the internet, a satellite network, a wide area network (WAN), such as a metropolitan area network, a local area network (LAN), an intranet, or other suitable network, or combination thereof, although the network 60 currently having the broadest application and use of the wireless check authorization system 10 is the internet.

The wireless check authorization system 10, then, comprises the handheld wireless device client 20, 25, or 30, which may be the text messaging and/or web enabled cell phone 20, the personal digital assistant (PDA) 25, the pager 30, or the other suitable wireless device, the wireless service provider 50, the network 60, and the checking account status system 40, comprising the server 70, the internal database 75, and the optional external database 80. The handheld wireless device client 20, 25, or 30 communicates via the network 60 with the server 70 one with the other, and the server 70 communicates with the handheld wireless device client 20, 25, or 30 one with the other via the network 60, which may be the internet or other suitable network. The handheld wireless device client 20, 25, or 30 requests check authorization instructions from the server 70, the server 70 requesting checking account information from the internal database 75. The server 70 analyzes the checking account information and generates check authorization instructions, and the server 70 provides the check authorization instructions to the wireless device client 20, 25, or 30 in a text message and/or web enabled format. The server 70 may additionally or optionally analyze checking account information and generate check authorization instructions from checking account information resident within the external database 80.

Figure 2:
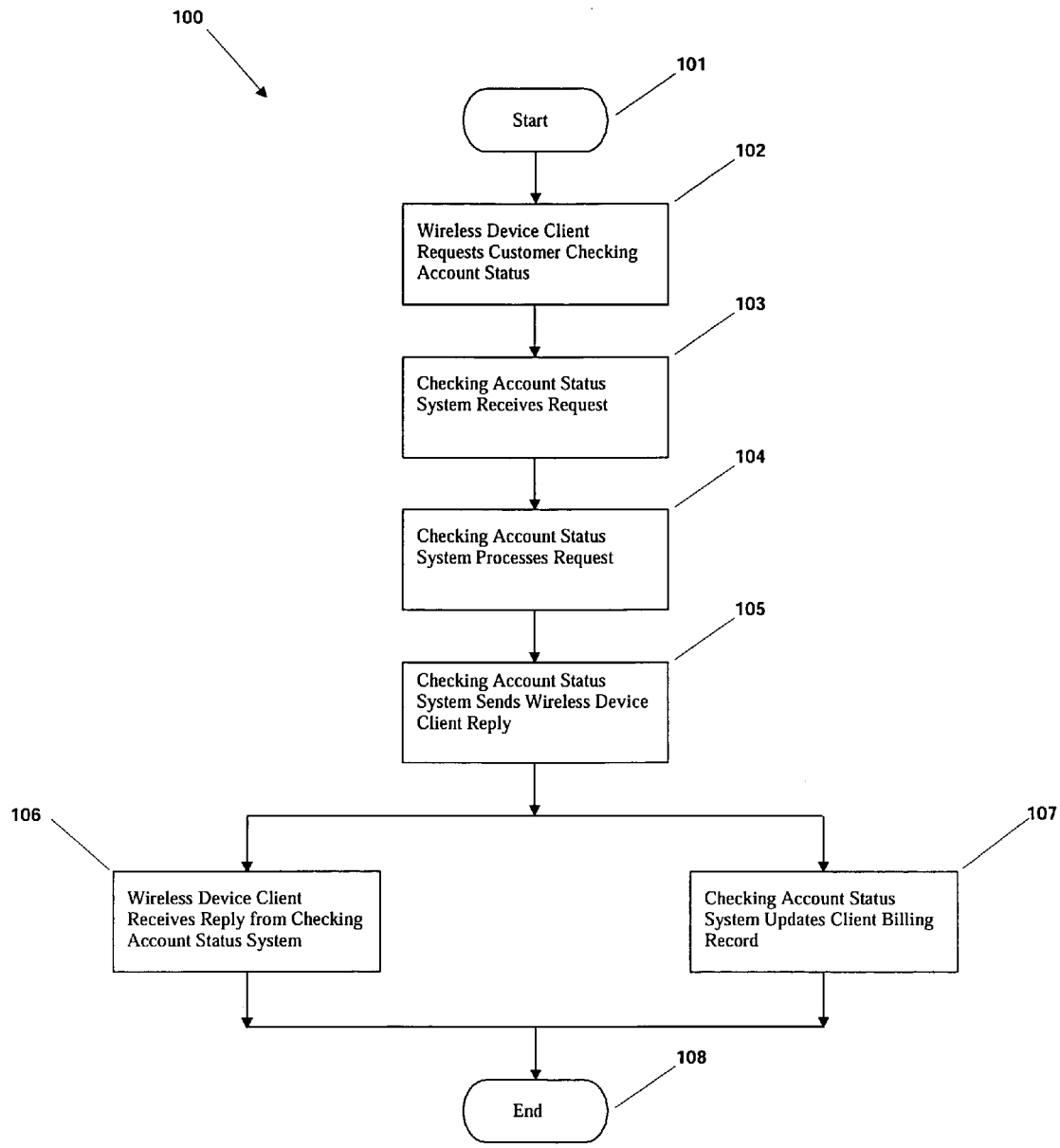
FIG. 2 is a schematic representation of a wireless check authorization method of the present invention.

FIG. 2 shows steps of a wireless check authorization method 100 of the present invention for use with the wireless check authorization system 10, in which a check taker, who may be a payee, an individual accepting a check on behalf of the payee, a delivery person, customer service agent, merchant, other individual, or other suitable person, enters a wireless check authorization request into the handheld wireless device client 20, 25, or 30.

The wireless check authorization system 10 and the wireless check authorization method 100 of the present invention deliver checking account authorization information interactively in real time to the handheld wireless device client 20, 25, or 30 in response to an inquiry by the handheld wireless device client 20, 25, or 30. The handheld wireless device client 20, 25, or 30 and the server 70 communicate one with the other interactively in real time, and the server 70 communicates with the internal database 75 one with the other in real time in response to the inquiry by the handheld wireless device client 20, 25, or 30. The server 70 also communicates with the optional external database 80 one with the other, if available, in real time in response to the inquiry by the handheld wireless device client 20, 25, or 30.

The wireless check authorization request includes checking account information to be processed by the wireless check authorization system 10 and an identifier, which identifies the check taker.

The wireless check authorization method 100, starts at step 101. Upon entry of the wireless check authorization request into the handheld wireless device client 20, 25, or 30 at the start (step 101) by the check taker, the handheld wireless device client 20, 25, or 30 requests customer checking account status at step 102. The request for checking account status is transmitted to the checking account status system 40 via the wireless service provider 50 through the network 60. The checking account status system 40 receives the request at step 103.

Figure 3:
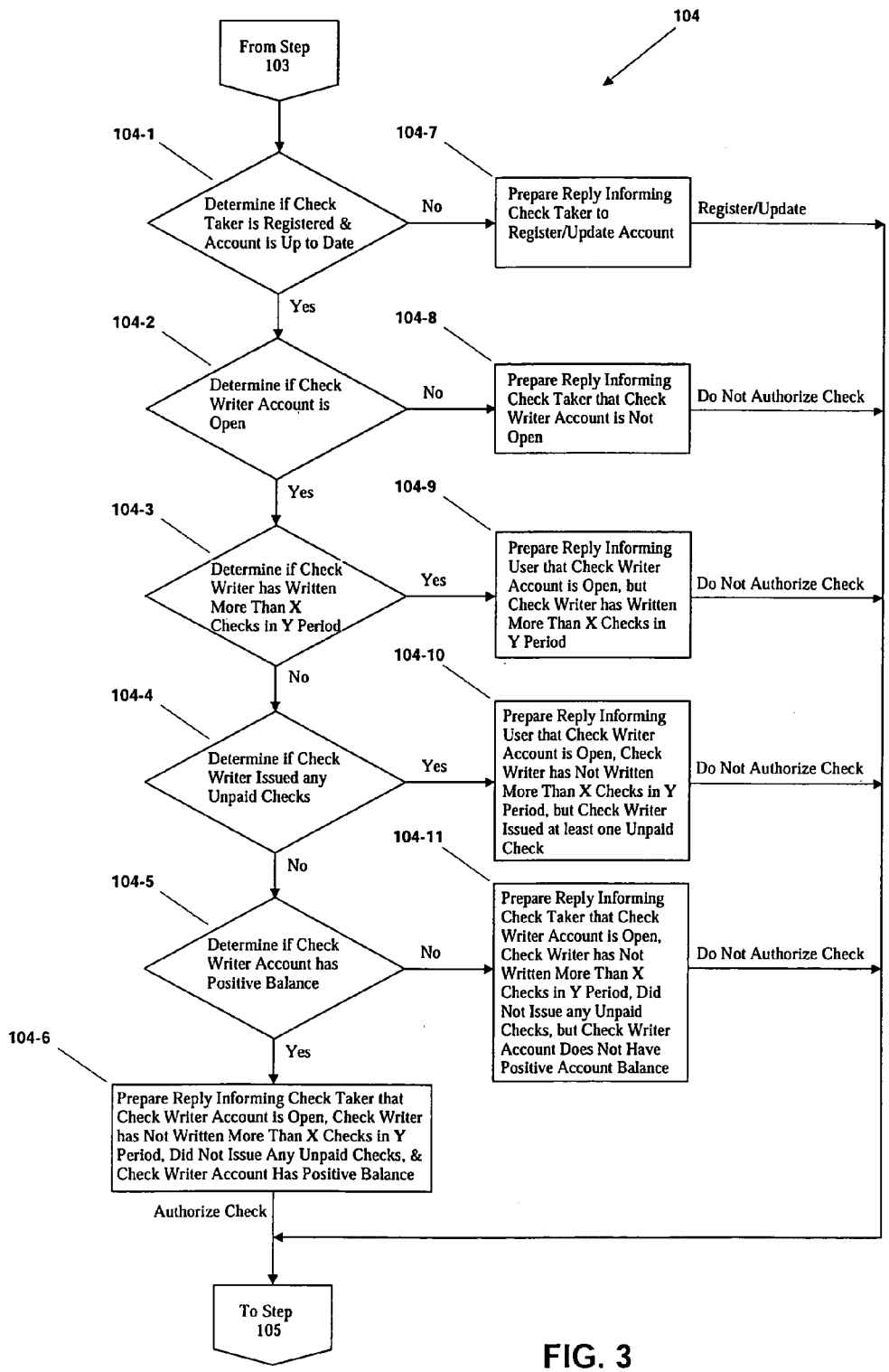
FIG. 3 is a schematic representation of a checking account status method of the present invention.

The checking account status system 40 processes the request at step 104, which is shown in more detail in FIG. 3, into instructions to be issued to the handheld wireless device client 20, 25, or 30. Step 104 comprises a method for determining checking account status and issuance of instructions to the handheld wireless device client 20, 25, or 30, and may hereinafter alternatively be called wireless checking account status and instruction method 104 interchangeably with the term "step 104".

The wireless checking account status and instruction method 104 of the wireless check authorization method 100 determines if the check taker is registered, which indicates whether the check taker is authorized to use the wireless check authorization system 10, and if the account of the check taker is up to date, and whether the check writer checking account is open, whether the check writer has issued any unpaid checks, and whether the check writer checking account has a positive account balance, and issues instructions to be sent to the handheld wireless device client 20, 25, or 30 at step 105.

Upon processing the checking account status request at step 104, the server 70 either issues suitable instructions to the handheld wireless device client 20, 25, or 30 to authorize or not authorize the check for which the checking account authorization is being requested.

The checking account status request is routed within the checking account status system 40 to the server 70, which communicates with the internal database 75, and requests suitable database information from the internal database 75 for the wireless check authorization request. The internal database 75 replies to the server 70, and if sufficient checking account information is available received by the server 70 from the internal database 75 to make a decision and issue instructions to the handheld wireless device client 20, 25, or 30, the server 70 processes the checking account information received from the internal database 75 into suitable instructions to be sent to the handheld wireless device client 20, 25, or 30. If insufficient checking account information is received by the server 70 from the internal database 75 to make a decision and issue instructions to the handheld wireless device client 20, 25, or 30, the server 70 requests checking account information from the optional external database 80, if available. If the optional external database 80 is available, the optional external internal database 80 replies to the server 70, and if sufficient checking account information is received by the server 70 from the optional external database 80 to make a decision and issue instructions to the handheld wireless device client 20, 25, or 30, the server 70 processes the checking account information received from the optional external database 80 into suitable instructions to be sent to the handheld wireless device client 20, 25, or 30. If insufficient checking account information is received by the server 70 from the internal database 75, if the optional external database 80 is not available, or if insufficient checking account information is received by the server 70 from the optional external database 80, if the optional external database 80 is available, the server 70 makes a decision and issues suitable instructions to the handheld wireless device client 20, 25, or 30 to not authorize the check for which the checking account authorization is being requested.

The checking account status system 40 sends the handheld wireless device client 20, 25, or 30 a reply at step 105, which includes the suitable instructions generated by the server 70 to the handheld wireless device client 20, 25, or 30, to authorize or not authorize the check for which the checking account authorization is being requested. The handheld wireless device client 20, 25, or 30 receives the reply with the instructions authorizing or not authorizing the check for which the checking account authorization is being requested at step 106.

The checking account status system 40 updates the client billing record for the check taker for which the checking account authorization is being requested at step 107, the client having an identifier, which identifies the check taker.

The check taker receives the instructions at the handheld wireless device client 20, 25, or 30 authorizing or not authorizing the check at end (step 108), at which step the wireless check authorization method 100 ends.

The server 70 either issues suitable instructions to the handheld wireless device client 20, 25, or 30 to authorize or not authorize the check for which the checking account authorization is being requested at step 104, as shown in FIG. 3.

The checking account status system 40 receives the checking account status request from the handheld wireless device client 20, 25, or 30 at step 103, and processes the request at step 104. Each of the steps 104-1 through 104-11, inclusive, are performed by the checking account status system 40. The checking account status system 40 sends the checking account status reply, which includes the instructions authorizing or not authorizing the check for which the checking account authorization is being requested, to the handheld wireless device client 20, 25, or 30 at step 105.

The checking account status system 40 determines if the check taker is registered and/or whether the account of the check taker is up to date at step 104-1.

If the check taker is registered and the account of the check taker is up to date at step 104-1, the checking account status system 40 determines if the check writer account, i.e., if the account of the check for which the checking account authorization is being requested, is open at step 104-2.

If the check writer account is open at step 104-2, the checking account status system 40 determines if the check writer, i.e., the writer of the check for which the checking account authorization is being requested, has not written more than a specified number of checks in a specified time period at step 104-3. The specified number of checks is represented by "X", and the specific time period is represented by "Y" at step 104-3 and elsewhere in FIG. 3. The payee may specify the specific number of checks X and the specific time period Y. The payee may, thus, specify that if the check writer has written more than the specified number of checks X within the specified time period Y, then the check for which authorization is being requested will not be authorized at the point of transaction.

If the writer of the check for which the checking account authorization is being requested has not written more than the specified number of checks X in the specified time period Y at step 104-3, the checking account status system 40 determines if the check writer issued any unpaid checks at step 104-4.

If the check writer did not issue any unpaid checks at step 104-4, the checking account status system 40 determines if the check writer account has a positive account balance at step 104-5.

If the check writer account has a positive account balance at step 104-5, the checking account status system 40 prepares a reply informing the check taker that that the check writer account is open, the check writer did not write more than the specified number of checks X in the specified time period Y, the check writer did not issue any unpaid checks, and the check writer account has a positive balance in the form of an instruction to the check taker, which authorizes the check at step 104-6, such as a simple "Yes" or "Authorized" or other suitable expression that is easily understood by the check taker that the check is authorized. The checking account status system 40 sends the checking account status reply, which includes the instructions authorizing the check for which the checking account authorization is being requested, to the handheld wireless device client 20, 25, or 30 at step 105.

If the check taker is not registered and/or the account of the check taker is not up to date at step 104-1, the checking account status system 40 prepares a reply to the check taker informing the check taker to register and/or update the check taker's account at step 104-7. The checking account status system 40 sends the checking account status reply, which is in the form of an instruction to register and/or update the check taker's account, such as a simple "Register" and/or "Update" or other suitable expression that is easily understood by the check taker to register and/or update the check taker's account to the handheld wireless device client 20, 25, or 30 at step 105.

The payee may register and/or update the payee's account and/or a sub account of the check taker by accessing the personal computer 90, and entering appropriate registration and/or update information into the personal computer 90, as required by the server 70, the personal computer 90 and the server 70 communicating one with the other, to register and/or update the payee's account and/or the check taker's account with the checking account status system 40.

If the check writer account is not open at step 104-2, the checking account status system 40 prepares a reply informing the check taker that the check writer checking account is not open, in the form of an instruction to the check taker that the check is not authorized at step 104-8, such as a simple "No" or "Not Authorized" or other suitable expression that is easily understood by the check taker that the check is not authorized. The instruction may optionally also include information that the check writer checking account is not open. The checking account status system 40 sends the checking account status reply, which includes the instruction not authorizing the check for which the checking account authorization is being requested and any optional information that the check writer checking account is not open, to the handheld wireless device client 20, 25, or 30 at step 105.

If the check writer has written more than the specified number of checks X in the specified time period Y at step 104-3, the checking account status system 40 prepares a reply informing the check taker that the check writer checking account is open, but the check writer has written more than the specified number of checks X in the specified time period Y, in the form of an instruction to the check taker that the check is not authorized at step 104-8, such as a simple "No" or "Not Authorized" or other suitable expression that is easily understood by the check taker that the check is not authorized. The instruction may optionally also include information that the check writer has written more than the specified number of checks X in the specified time period Y. The checking account status system 40 sends the checking account status reply, which includes the instruction not authorizing the check for which the checking account authorization is being requested and any optional information that the check writer checking account is open, but the check writer has written more than the specified number of checks X in the specified time period Y, to the handheld wireless device client 20, 25, or 30 at step 105.

If the check writer issued any unpaid checks as determined at step 104-4, the checking account status system 40 prepares a reply informing the check taker that the check writer checking account is open, the check writer has not written more than the specified number of checks X in the specified time period Y, but the check writer issued at least one unpaid check, in the form of an instruction to the check taker that the check is not authorized at step 104-10, such as a simple "No" or "Not Authorized" or other suitable expression that is easily understood by the check taker that the check is not authorized. The instruction may optionally also include information that the check writer checking account is open, the check writer has not written more than the specified number of checks X in the specified time period Y, but the check writer issued at least one unpaid check. The checking account status system 40 sends the checking account status reply, which includes the instruction not authorizing the check for which the checking account authorization is being requested and any optional information that the check writer checking account is open, the check writer has not written more than the specified number of checks X in the specified time period Y, but the check writer issued at least one unpaid check, to the handheld wireless device client 20, 25, or 30 at step 105.

If the check writer checking account does not have a positive account balance at step 104-5, the checking account status system 40 prepares a reply informing the check taker that the check writer account is open, the check writer has not written more than the specified number of checks X in the specified time period Y, the check writer did not issue any unpaid checks, but the check writer account does not have a positive checking account balance, in the form of an instruction to the check taker that the check is not authorized at step 104-11, such as a simple "No" or "Not Authorized" or other suitable expression that is easily understood by the check taker that the check is not authorized. The instruction may optionally also include information that the check writer account is open, the check writer has not written more than the specified number of checks X in the specified time period Y, the check writer did not issue any unpaid checks, but the check writer account does not have a positive checking account balance. The checking account status system 40 sends the checking account status reply, which includes the instruction not authorizing the check for which the checking account authorization is being requested and any optional information that the check writer account is open, the check writer has not written more than the specified number of checks X in the specified time period Y, the check writer did not issue any unpaid checks, but the check writer account does not have a positive checking account balance, to the handheld wireless device client 20, 25, or 30 at step 105.

Again, the wireless checking account status and instruction method 104 of the wireless check authorization method 100 determines if the check taker is registered and if the account of the check taker is up to date, and whether the check writer checking account is open, whether the check writer has issued any unpaid checks, and whether the check writer checking account has a positive account balance, and issues instructions to be sent to the handheld wireless device client 20, 25, or 30 at step 105.

Again, the payee may register and/or update the payee's account and/or check taker's sub account by accessing the personal computer 90, and entering appropriate registration and/or update information into the personal computer 90, as required by the server 70, the personal computer 90 and the server 70 communicating one with the other interactively, to register and/or update the payee's account and/or the check taker's sub account with the checking account status system 40.

Figure 4:
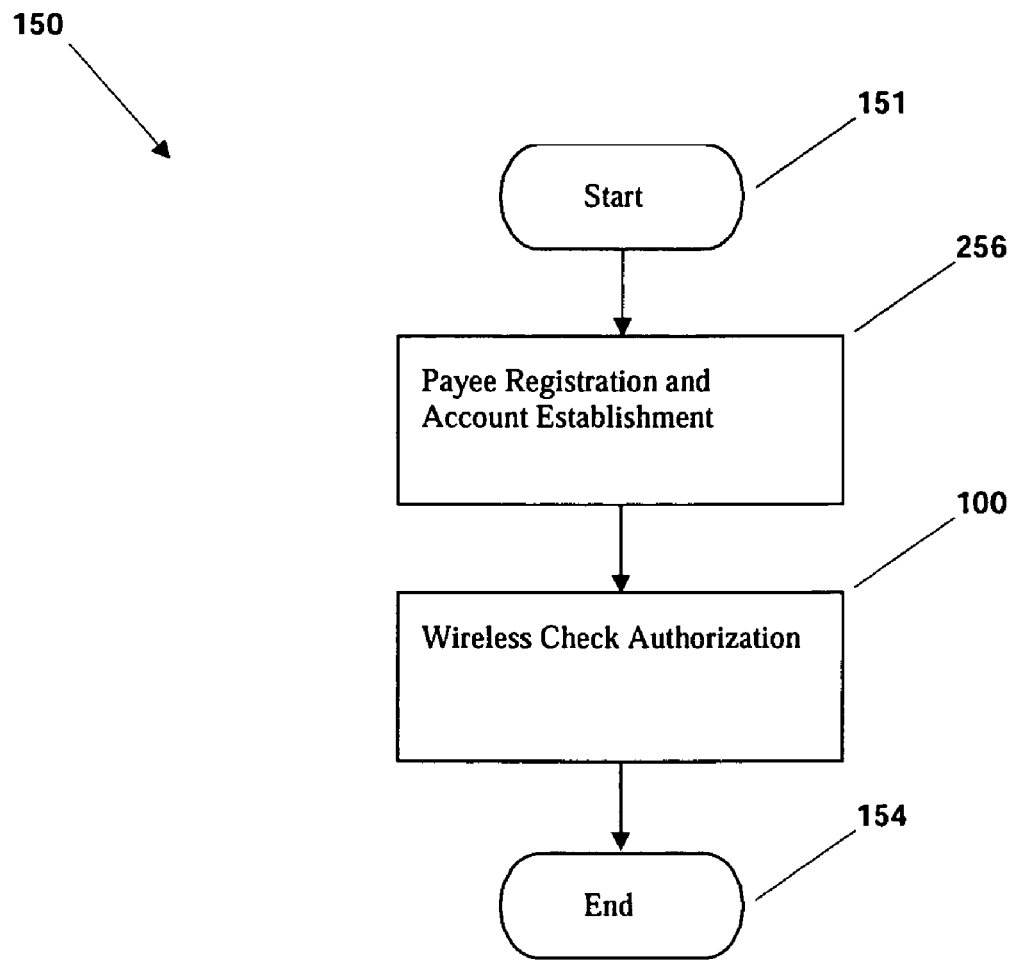
FIG. 4 is a schematic representation of a check taker registration, account establishment, and wireless check authorization method of the present invention.

FIG. 4 shows a check taker registration, account establishment, and wireless check authorization method 150 of the present invention, which starts at step 151, is followed by check taker registration and account establishment at step 256, then by the wireless check authorization method 100 of the present invention, and ends at step 154. The payee typically registers and establishes an account and sub accounts of the check takers with the wireless check authorization system 10 at step 256, after which the check takers may use the wireless check authorization method 100. The check takers may use the wireless check authorization method 100 repeatedly after registration and establishment of the respective check taker's account, if the account of the payee and the account of the check taker is up to date, although registration and account establishment of the payee is typically a one time event.

The payee may update the account of the payee and any or all of the sub accounts of the check takers at any time prior to and/or during use of the wireless check authorization method 100. The payee may register and/or update sub accounts of the check takers at any time, give each of the check takers the same and/or different privileges, and allow or cancel use of the wireless check authorization system 10 and the wireless check authorization method 100 by any or all of the check takers at any time.

The payee may specify at step 256 the specific number of checks X and the specific time period Y for which if the check writers write more than the specified number of checks X within the specified time period Y, then the checks for which authorization are requested will not be authorized at the point of transaction. The payee may specify different values for the specific number of checks X and different values for the specific time period Y for banks having different routing numbers and for check writers having different checking accounts.

Figure 5:
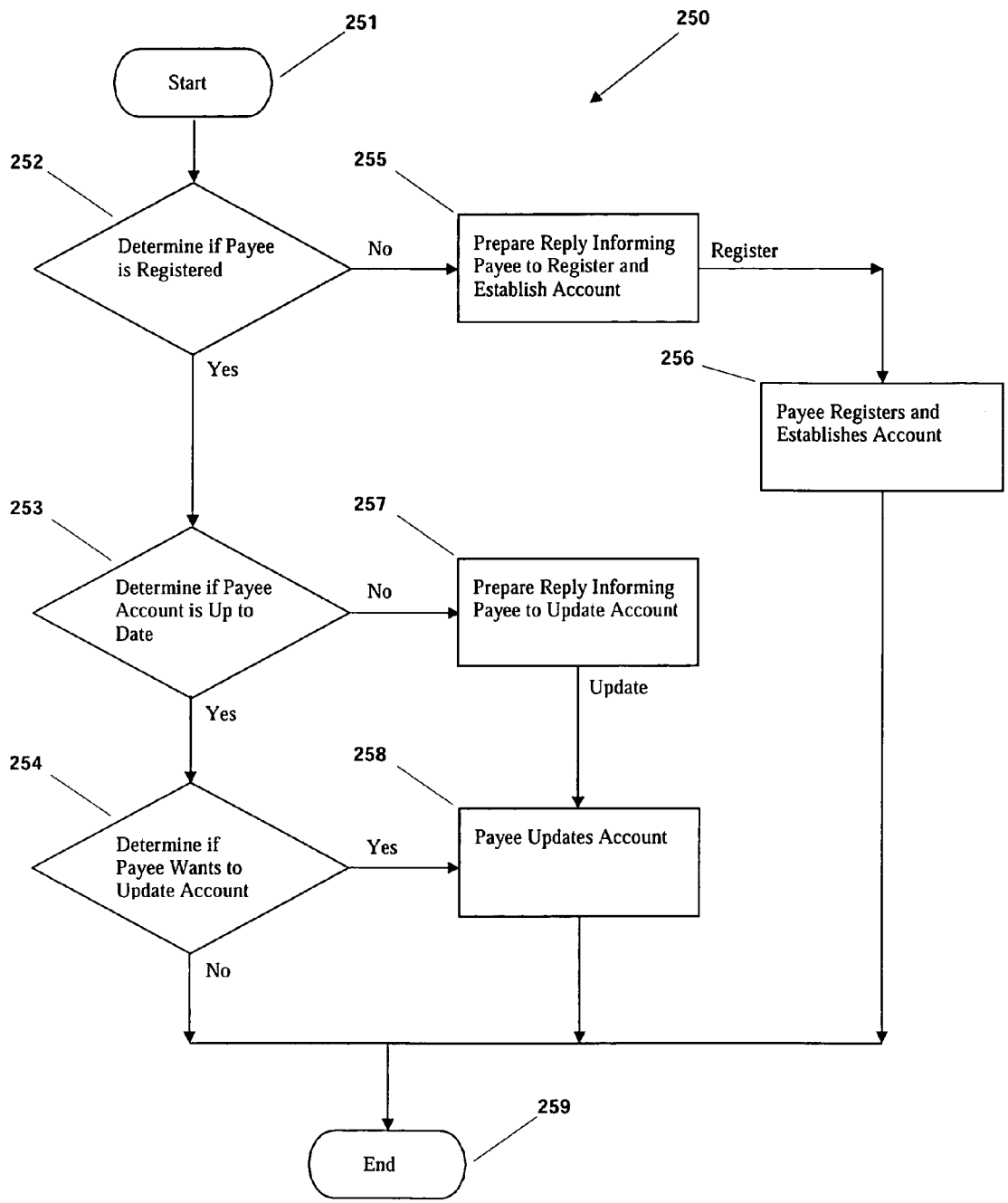
FIG. 5 is a schematic representation of check taker registration, account establishment, and account updating method of the present invention.

FIG. 5 shows a check taker registration, account establishment, and account updating method 250 of the present invention, which starts at step 251. The payee accesses and communicates with the server 70 via the network 60 through the personal computer 90 interactively in real time by entering a uniform resource locator (URL), IP address, or other suitable identifier of the server 70 into the personal computer 90 and suitable information as required by the server 70.

The server 70 determines if the payee is registered at step 252. If the payee is registered at step 252, the server 70 determines if the account of the payee is up to date at step 253. If the account of the payee is up to date at step 253, the server 70 determines if the payee wants to update the account of the payee and/or the account of any or all of the check takers at step 254. If the payee does not want to update the account of the payee and/or the accounts of any of the check takers at step 254, the check taker registration, account establishment, and account updating method 250 ends at step 259.

The payee registers and establishes an account at step 256 of the check taker registration, account establishment, and account updating method 250, if the payee has not already registered and established an account, using the check taker registration, account establishment, and wireless check authorization method 150, shown in FIG. 4.

If the server 70 determines that the payee is not registered at step 252, the server 70 replies to the payee informing the payee to register and establish an account at step 255. The payee registers and establishes an account at step 256 of the check taker registration, account establishment, and account updating method 250, which is substantially the same as step 256 of the check taker registration, account establishment, and wireless check authorization method 150. The payee registers an account for the payee and any sub accounts for the check takers at step 256. The check taker registration, account establishment, and account updating method 250 ends at step 259.

If the payee is registered at step 253 and the server 70 determines that the account of the payee is not up to date at step 253, the server 70 prepares a reply at step 257 informing the payee to update the account of the payee. The payee updates the account of the payee and any sub accounts of the check takers at step 258, and the check taker registration, account establishment, and account updating method 250 ends at step 259.

If the payee is registered at step 253 and the server 70 determines that the account of the payee is up to date at step 253 and the payee wants to update the account of the payee at step 254, the payee updates the account of the payee and any sub accounts of the check 20 takers at step 258, and the check taker registration, account establishment, and account updating method 250 ends at step 259.

The payee may specify at step 256 and/or step 258 the specific number of checks X and the specific time period Y for which if the check writers write more than the specified number of checks X within the specified time period Y, then the checks for which authorization are requested will not be authorized at the point of transaction. The payee may specify different values for the specific number of checks X and different values for the specific time period Y for banks having different routing numbers and for check writers having different checking accounts.

Figure 6:
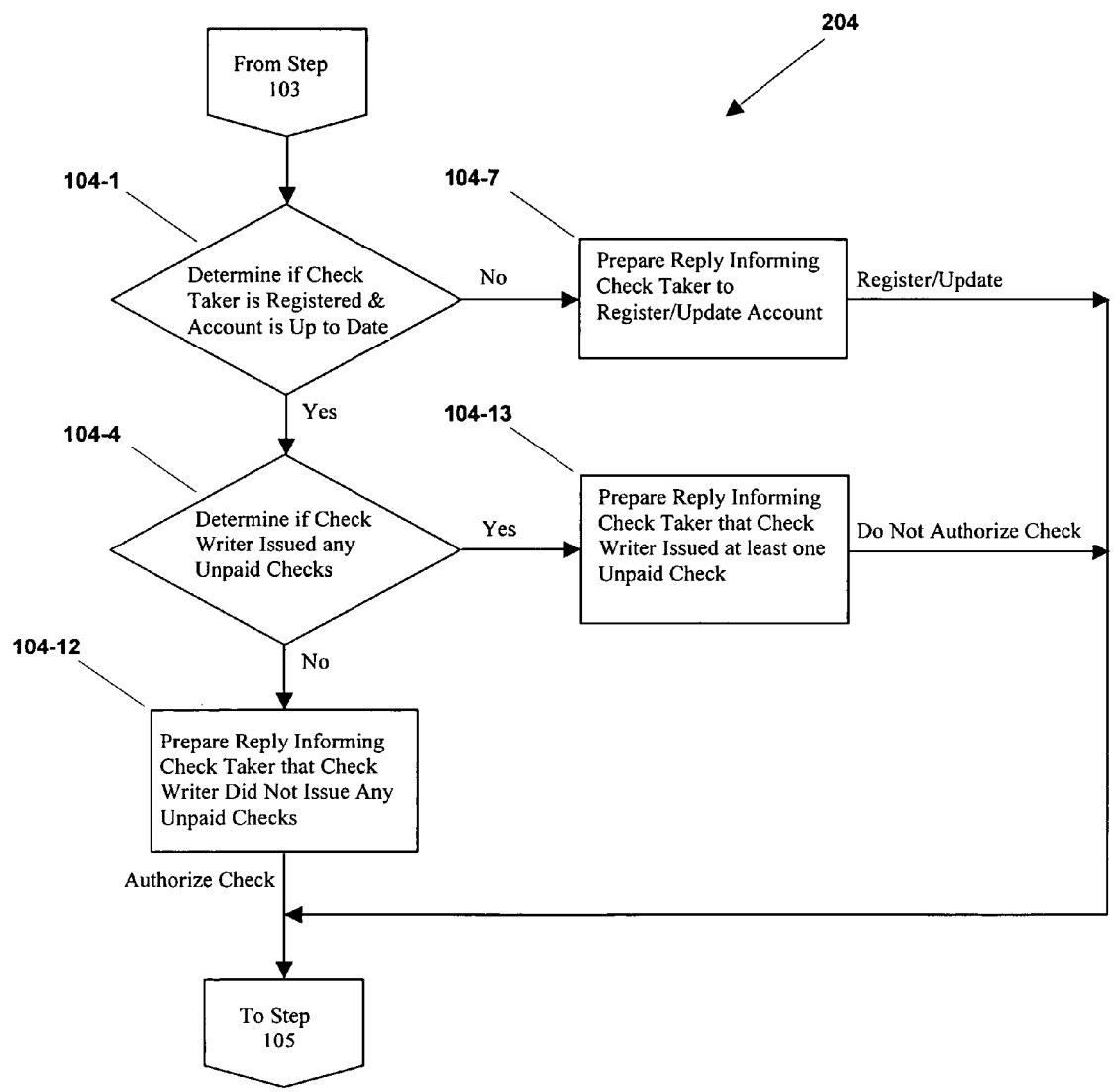
FIG. 6 is a schematic representation of an alternate embodiment of a checking account status method of the present invention.

FIG. 6 shows an alternate embodiment of a wireless checking account status and instruction method 204, which determines if the check writer issued any unpaid checks, determines if the check taker is registered and if the account of the check taker is up to date, and whether the check writer has issued any unpaid checks, and issues instructions to be sent to the handheld wireless device client 20, 25, or 30 at step 105.

The wireless checking account status and instruction method 204 may be used in lieu of the wireless checking account status and instruction method 104 of the wireless check authorization method 100, when it is deemed sufficient by the check taker that a determination of whether the check writer has issued any unpaid checks is sufficient for checking account authorization rather than the more thorough determination of whether the check writer checking account is open, whether the check writer has written more than the specified number of checks X in the specified time period Y, whether the check writer has issued any unpaid checks, and whether the check writer checking account has a positive account balance.

When the wireless checking account status and instruction method 204 is used with the wireless check authorization method 100 in lieu of the wireless checking account status and instruction method 104, the wireless checking account status and instruction method 204 performs substantially the same steps 104-1, 104-4, and 104-7 as in the wireless checking account status and instruction method 104. Steps 104-12 and 104-13, of the wireless checking account status and instruction method 204 are substantially the same as steps 104-6 and 104-10, respectively, of the wireless checking account status and instruction method 104.

As shown in FIG. 6 for the wireless checking account status and instruction method 204, if the check taker is registered, which indicates whether the check taker is authorized to use the wireless check authorization system 10, and if the account of the check taker is up to date at step 104-1, the checking account status system 40 determines if the check writer did not issue any unpaid checks at step 104-4.

If the check writer did not issue any unpaid checks at step 104-4 of the wireless checking account status and instruction method 204, the checking account status system 40 prepares a reply informing the check taker that the check writer did not issue any unpaid checks in the form of an instruction to the check taker, which authorizes the check at step 104-12, such as a simple "Yes" or "Authorized" or other suitable expression that is easily understood by the check taker that the check is authorized. The checking account status system 40 sends the checking account status reply, which includes the instructions authorizing the check for which the checking account authorization is being requested, to the handheld wireless device client 20, 25, or 30 at step 105.

If the check taker is not registered and/or the account of the check taker is not up to date at step 104-1 of the wireless checking account status and instruction method 204, the checking account status system 40 prepares a reply to the check taker informing the check taker to register and/or update the check taker's account at step 104-7. The checking account status system 40 sends the checking account status reply, which is in the form of an instruction to register and/or update the check taker's account, such as a simple "Register" and/or "Update" or other suitable expression that is easily understood by the check taker to register and/or update the check taker's account to the handheld wireless device client 20, 25, or 30 at step 105.

The check taker may register and/or update the check taker's account by accessing the personal computer 90, and entering appropriate registration and/or update information into the personal computer 90, as required by the server 70, the personal computer 90 and the server 70 communicating one with the other interactively, to register and/or update the check taker's account with the checking account status system 40.

If the check writer issued any unpaid checks as determined at step 104-4 of the wireless checking account status and instruction method 204, the checking account status system 40 prepares a reply informing the check taker that the check writer issued at least one unpaid check, in the form of an instruction to the check taker that the check is not authorized at step 104-13, such as a simple "No" or "Not Authorized" or other suitable expression that is easily understood by the check taker that the check is not authorized. The instruction may optionally also include information that the check writer issued at least one unpaid check. The checking account status system 40 sends the checking account status reply, which includes the instruction not authorizing the check for which the checking account authorization is being requested and any optional information that the check writer issued at least one unpaid check, to the handheld wireless device client 20, 25, or 30 at step 105.

Again, the wireless checking account status and instruction method 204 of the wireless check authorization method 100 determines if the check taker is registered and if the account of the check taker is up to date, and whether the check writer has issued any unpaid checks, and issues instructions to be sent to the handheld wireless device client 20, 25, or 30 at step 105.

Again, the wireless check authorization system 10 and the wireless check authorization method 100 of the present invention deliver checking account authorization information interactively in real time to the handheld wireless device client 20, 25, or 30 in response to an inquiry by the handheld wireless device client 20, 25, or 30.

The payee may register the handheld wireless device clients 20, 25, or 30 with the wireless check authorization system 10 by providing a phone number, pager number, or other suitable identifier that identifies the handheld wireless device clients 20, 25, or 30 and/or the check takers representing the payee to the server 70 of the checking account status system 40 via the personal computer 90.

Each of the checks typically has a bank routing number and a checking account number.

The check taker may enter the bank routing number and the account number of the check to be authorized as fields into the handheld wireless device client 20, 25, or 30; however, the wireless check authorization method 100 determines if the check taker is registered and has an updated account, and only determines if the check will be authorized or not authorized if the check taker and/or the handheld wireless device client 20, 25, or 30 is registered and updated with the wireless check authorization system 10. The dollar amount of the check for which check authorization is requested may optionally be entered into the handheld wireless device client 20, 25, or 30 by the check taker as a third optional field, for which a check guarantee may optionally be requested, which may be offered by a check guarantee service via the wireless check authorization system 10 to guarantee or not guarantee the check for which check authorization is requested. The payee may pay for services rendered by the wireless check authorization system 10 by check, debit, credit card, or other suitable payment method.

Although the present invention has been described in considerable detail with reference to certain preferred versions thereof, other versions are possible. Therefore, the spirit and scope of the appended claims should not be limited to the description of the preferred versions contained herein.

What is claimed is:

1. A wireless check authorization method, in which a server responsive to a handheld wireless device client operated by a check taker requests checking account authorization for a check written by a check writer having a checking account, the server interacting with a database having checking account status information and check taker account information, comprising the steps of:
   a) said server determining from said database check taker account information if said check taker is registered to use said check authorization method and if said check taker has a check taker account that is up to date,
      a1) if said check taker is not registered to use said check authorization method, informing said check taker to register to use said check authorization method and establish said check taker account,
      a2) if said check taker is registered to use said check authorization method, said server determining from said database check taker account information if said check taker has said check taker account that is up to date,
      a3) if said check taker is registered to use said check authorization method and if said check taker account is not up to date, informing said check taker to update said check taker account;
   b) if said check taker is registered to use said check authorization method and said check taker has an account that is up to date, said server determining from said database checking account information if said check writer checking account is open,
      b1) if said check writer checking account is not open, informing said check taker that said check writer checking account is not open;
   c) if said check taker is registered to use said check authorization method and said check taker has an account that is up to date and said check writer checking account is open, said server determining from said database checking account information if said check writer has written more than a specified number of checks in a specified time period,
      c1) if said check writer has written more than said specified number of checks in said specified time period, informing said check taker that said check writer checking account is open, but said check writer has written more than said specified number of checks in said specified time period;
   d) if said check taker is registered to use said check authorization method and said check taker has an account that is up to date and said check writer checking account is open, and said check writer has not written more than said specified number of checks in said specified time period, said server determining from said database checking account information if said check writer issued at least one said check that has been unpaid,
      d1) if said check writer issued said at least one check that has been unpaid, informing said check taker that said check writer checking account is open and said check writer has not written more than said specified number of checks in said specified time period, but said check writer issued said at least one check that has been unpaid;
   e) if said check taker is registered to use said check authorization method and said check taker has an account that is up to date and said check writer checking account is open, and said check writer has not written more than said specified number of checks in said specified time period, and said check writer did not issue said at least one check that has been unpaid, said server determining from said database checking account information if said check writer checking account has a positive account balance,
      e1) if said check writer checking account does not have a positive checking account balance, informing said check taker that said check writer checking account is open, and said check writer has not written more than said specified number of checks in said specified time period, and said check writer did not issue said at least one check that has been unpaid, but said check writer checking account does not have a positive checking account balance;
      e2) if said check writer checking account does have a positive checking account balance, informing said check taker that said check writer checking account is open, and said check writer has not written more than said specified number of checks in said specified time period, and said check writer did not issue said at least one check that has been unpaid, and said check writer checking account does have a positive checking account balance.

2. The wireless check authorization method of claim 1, wherein said server resides on said network.

3. The wireless check authorization method of claim 1, wherein said handheld wireless device client and said server communicate one with the other via a wireless service provider and a network interconnected one with the other, said server residing on said network.

4. The wireless check authorization method of claim 1, wherein said network is from the group consisting of a public network, a private network, a generic network, a global network, an internet, a satellite network, a wide area network a metropolitan area network, a local area network, an intranet, and combinations thereof.

5. The wireless check authorization method of claim 1, wherein said handheld wireless device client is from the group consisting of a text message enabled cell phone, a web enabled cell phone, a personal digital assistant, a pager, and a mobile phone.

6. The wireless check authorization method of claim 1, wherein said handheld wireless device client is an off-the-shelf text message enabled cell phone.

7. The wireless check authorization method of claim 1, wherein said handheld wireless device client is an off-the-shelf web enabled cell phone.

8. The wireless check authorization method of claim 1, wherein said handheld wireless device client is an off-the-shelf pager.

9. The wireless check authorization method of claim 1, wherein said handheld wireless device client is an off-the-shelf personal digital assistant.

10. A wireless check authorization method, in which a server responsive to a handheld wireless device client operated by a check taker requests checking account authorization for a check written by a check writer having a checking account, the server interacting with a database having checking account status information and check taker account information, comprising the steps of:
   a) said server determining from said database check taker account information if said check taker is registered to use said check authorization method and if said check taker has a check taker account that is up to date,
   a1) if said check taker is not registered to use said check authorization method, informing said check taker to register to use said check authorization method and establish said check taker account,
   a2) if said check taker is registered to use said check authorization method, said server determining from said database check taker account information if said check taker has said check taker account that is up to date,
   a3) if said check taker is registered to use said check authorization method and if said check taker account is not up to date, informing said check taker to update said check taker account;
   b) if said check taker is registered to use said check authorization method and said check taker has an account that is up to date, said server determining from said database checking account information if said check writer checking account is open,
      b1) if said check writer checking account is not open, informing said check taker that said check is not authorized;
   c) if said check taker is registered to use said check authorization method and said check taker has an account that is up to date and said check writer checking account is open, said server determining from said database checking account information if said check writer has written more than a specified number of checks in a specified time period,
      c1) if said check writer has written more than said specified number of checks in said specified time period, informing said check taker that said check is not authorized;
   d) if said check taker is registered to use said check authorization method and said check taker has an account that is up to date and said check writer checking account is open, and said check writer has not written more than said specified number of checks in said specified time period, said server determining from said database checking account information if said check writer issued at least one said check that has been unpaid,
      d1) if said check writer issued said at least one check that has been unpaid, informing said check taker that said check is not authorized;
   e) if said check taker is registered to use said check authorization method and said check taker has an account that is up to date and said check writer checking account is open, and said check writer has not written more than said specified number of checks in said specified time period, and said check writer did not issue said at least one check that has been unpaid, said server determining from said database checking account information if said check writer checking account has a positive account balance,
      e1) if said check writer checking account does not have a positive checking account balance, informing said check taker that said check is not authorized;
      e2) if said check writer checking account does have a positive checking account balance, informing said check taker that said check is authorized.

11. The wireless check authorization method of claim 10, wherein said server resides on said network.

12. The wireless check authorization method of claim 10, wherein said handheld wireless device client and said server communicate one with the other via a wireless service provider and a network interconnected one with the other, said server residing on said network.

13. The wireless check authorization method of claim 10, wherein said network is from the group consisting of a public network, a private network, a generic network, a global network, an internet, a satellite network, a wide area network a metropolitan area network, a local area network, an intranet, and combination thereof.

14. The wireless check authorization method of claim 10, wherein said handheld wireless device client is from the group consisting of a text message enabled cell phone, a web enabled cell phone, a personal digital assistant, a pager, and a mobile phone.

15. The wireless check authorization method of claim 10, wherein said handheld wireless device client is an off-the-shelf text message enabled cell phone.

16. The wireless check authorization method of claim 10, wherein said handheld wireless device client is an off-the-shelf web enabled cell phone.

17. The wireless check authorization method of claim 10, wherein said handheld wireless device client is an off-the-shelf pager.

18. The wireless check authorization method of claim 10, wherein said handheld wireless device client is an off-the-shelf personal digital assistant.

19. A wireless check authorization method, in which a server responsive to a handheld wireless device client operated by a check taker requests checking account authorization for a check written by a check writer having a checking account, the server interacting with a database having checking account status information and check taker account information, comprising the steps of:
  a) said server determining from said database check taker account information if said check taker is registered to use said check authorization method and if said check taker has a check taker account that is up to date,
    a1) if said check taker is not registered to use said check authorization method, informing said check taker to register to use said check authorization method and establish said check taker account,
    a2) if said check taker is registered to use said check authorization method, said server determining from said database check taker account information if said check taker has said check taker account that is up to date,
    a3) if said check taker is registered to use said check authorization method and if said check taker account is not up to date, informing said check taker to update said check taker account;
  b) if said check taker is registered to use said check authorization method and said check taker has an account that is up to date, said server determining from said database checking account information if said check writer issued at least one said check that has been unpaid,
    b1) if said check writer issued said at least one check that has been unpaid, informing said check taker that said check writer issued said at least one check that has been unpaid,
    b2) if said check writer did not issue said at least one check that has been unpaid, informing said check taker that said check writer did not issue said at least one check that has been unpaid.

20. The wireless check authorization method of claim 19, wherein said server resides on said network.

21. The wireless check authorization method of claim 19, wherein said handheld wireless device client and said server communicate one with the other via a wireless service provider and a network interconnected one with the other, said server residing on said network.

22. The wireless check authorization method of claim 19, wherein said network is from the group consisting of a public network, a private network, a generic network, a global network, an internet, a satellite network, a wide area network a metropolitan area network, a local area network, an intranet, and combination thereof.

23. The wireless check authorization method of claim 19, wherein said handheld wireless device client is from the group consisting of a text message enabled cell phone, a web enabled cell phone, a personal digital assistant, a pager, and a mobile phone.

24. The wireless check authorization method of claim 19, wherein said handheld wireless device client is an off-the-shelf text message enabled cell phone.

25. The wireless check authorization method of claim 19, wherein said handheld wireless device client is an off-the-shelf web enabled cell phone.

26. The wireless check authorization method of claim 19, wherein said handheld wireless device client is an off-the-shelf pager.

27. The wireless check authorization method of claim 19, wherein said handheld wireless device client is an off-the-shelf personal digital assistant.

28. A wireless check authorization method, in which a server responsive to a handheld wireless device client operated by a check taker requests checking account authorization for a check written by a check writer having a checking account, the server interacting with a database having checking account status information and check taker account information, comprising the steps of:
  a) said server determining from said database check taker account information if said check taker is registered to use said check authorization method and if said check taker has a check taker account that is up to date,
    a1) if said check taker is not registered to use said check authorization method, informing said check taker to register to use said check authorization method and establish said check taker account,
    a2) if said check taker is registered to use said check authorization method, said server determining from said database check taker account information if said check taker has said check taker account that is up to date,
    a3) if said check taker is registered to use said check authorization method and if said check taker account is not up to date, informing said check taker to update said check taker account;
  b) if said check taker is registered to use said check authorization method and said check taker has an account that is up to date, said server determining from said database checking account information if said check writer issued at least one said check that has been unpaid,
    b1) if said check writer issued at least one check that has been unpaid, informing said check taker that said check is not authorized,
    b2) if said check writer did not issue said at least one check that has been unpaid, informing said check taker that said check is authorized.

29. The wireless check authorization method of claim 28, wherein said server resides on said network.

30. The wireless check authorization method of claim 28, wherein said handheld wireless device client and said server communicate one with the other via a wireless service provider and a network interconnected one with the other, said server residing on said network.

31. The wireless check authorization method of claim 28, wherein said network is from the group consisting of a public network, a private network, a generic network, a global network, an internet, a satellite network, a wide area network a metropolitan area network, a local area network, an intranet, and combinations thereof.

32. The wireless check authorization method of claim 28, wherein said handheld wireless device client is from the group consisting of a test message enabled cell phone, a web enabled cell phone, a personal digital assistant, a pager, and a mobile phone.

33. The wireless check authorization method of claim 28, wherein said handheld wireless device client is an off-the-shelf text message enabled cell phone.

34. The wireless check authorization method of claim 28, wherein said handheld wireless device client is an off-the-shelf web enabled cell phone.

35. The wireless check authorization method of claim 28, wherein said handheld wireless device client is an off-the-shelf pager.

36. The wireless check authorization method of claim 28, wherein said handheld wireless device client is an off-the-shelf personal digital assistant.

* * * * *